United States Patent
Gulbrandsen et al.

(10) Patent No.: US 10,645,147 B1
(45) Date of Patent: May 5, 2020

(54) MANAGED FILE TRANSFER UTILIZING CONFIGURABLE WEB SERVER

(71) Applicant: EMC IP Holding Company LLC, Hopkinton, MA (US)

(72) Inventors: John Gulbrandsen, Natick, MA (US); Adel Hanna, North Grafton, MA (US); Latha Ramaswamy, Marlborough, MA (US); Praveen Tyagi, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 93 days.

(21) Appl. No.: 15/875,157

(22) Filed: Jan. 19, 2018

(51) Int. Cl.
  *G06F 15/16* (2006.01)
  *H04L 29/08* (2006.01)
  *G06F 17/18* (2006.01)

(52) U.S. Cl.
  CPC .............. *H04L 67/06* (2013.01); *G06F 17/18* (2013.01); *H04L 67/02* (2013.01)

(58) Field of Classification Search
  CPC .......... H04L 67/06; H04L 67/02; G06F 17/18
  USPC ....................................................... 709/217
  See application file for complete search history.

(56) References Cited

U.S. PATENT DOCUMENTS

| 2007/0043874 | A1  | 2/2007  | Nath et al. |           |
|--------------|-----|---------|-------------|-----------|
| 2016/0294651 | A1  | 10/2016 | Renna       |           |
| 2017/0094027 | A1  | 3/2017  | Zhou et al. |           |
| 2017/0149912 | A1* | 5/2017  | Hyman       | G06Q 30/02 |
| 2017/0208047 | A1* | 7/2017  | Rosenberg   | H04L 63/0485 |
| 2018/0262533 | A1  | 9/2018  | McCaig      | H04L 63/20 |
| 2018/0373617 | A1* | 12/2018 | Gaier       | G06F 11/3612 |
| 2019/0095478 | A1* | 3/2019  | Tankersley  | H04L 41/5009 |
| 2019/0095510 | A1* | 3/2019  | Cruise      | G06Q 10/10 |
| 2019/0102440 | A1* | 4/2019  | Tabak       | G06F 11/14 |
| 2019/0163678 | A1* | 5/2019  | Bath        | G06F 3/0481 |

* cited by examiner

*Primary Examiner* — Alan S Chou
(74) *Attorney, Agent, or Firm* — Ryan, Mason & Lewis, LLP

(57) ABSTRACT

An apparatus in one embodiment comprises a processing platform including a plurality of processing devices. The processing platform is configured to communicate over one or more networks with at least one product site and a plurality of user devices/systems. The processing platform is further configured, in conjunction with transfer of a first file from a particular product of the product site to a web server of the processing platform, to extract information characterizing the transfer of the first file from the particular product of the product site, to generate in an analytics processor file transfer statistics for the first file based at least in part on the extracted information, and to provide in a file transfer portal at least one visualization of at least a portion of the file transfer statistics for the first file. The file transfer portal is accessible to one or more of the user devices/systems over the one or more networks.

20 Claims, 5 Drawing Sheets

MANAGED FILE TRANSFER UTILIZING CONFIGURABLE WEB SERVER

FIELD

The field relates generally to information processing systems, and more particularly to file transfer in information processing systems.

BACKGROUND

Many information processing systems are configured to transfer files from data sources to various destinations over a network. However, issues can arise in conjunction with such file transfers. For example, in the case of usage data files or other types of files automatically generated by information technology (IT) products currently deployed in cloud-based or enterprise-based information processing systems, it can be difficult to determine file transfer status, estimated time of file transfer completion, file transfer success or failure, and other related file transfer information. Moreover, such information is not made accessible to users, thereby necessitating various types of manual intervention such as a user manually checking a transferred file to confirm that its size matches an expected file size.

SUMMARY

Illustrative embodiments provide techniques for managed file transfer in information processing systems, such as cloud-based or enterprise-based information processing systems comprising IT products that automatically generate files for transfer to a file repository. For example, some embodiments are configured to implement managed transfer of a given file from a particular product at a product site to a file repository in a manner that provides system users with real-time and dynamic progress insight regarding the file transfer. Such embodiments can advantageously provide significantly improved visibility into automated file transfer from a wide variety of different IT products deployed at customer sites or other types of product sites within an information processing system, while also avoiding the need for the above-noted manual intervention.

In one embodiment, an apparatus comprises at least one processing platform including a plurality of processing devices. The processing platform is configured to communicate over one or more networks with at least one product site and a plurality of user devices/systems. The processing platform is further configured, in conjunction with transfer of a first file from a particular product of the product site to a web server of the processing platform, to extract in the web server information characterizing at least a portion of the transfer of the first file from the particular product of the product site. The processing platform is also configured to generate in an analytics processor of the processing platform file transfer statistics for the first file based at least in part on the extracted information, and to provide in a file transfer portal of the processing platform at least one visualization of at least a portion of the file transfer statistics for the first file. The file transfer portal is accessible to one or more of the user devices/systems over the one or more networks.

The web server in some embodiments comprises a configurable plug-in component for extracting the information characterizing at least a portion of the transfer of the first file from the particular product of the product site. For example, the configurable plug-in component may provide a configurable interval parameter specifying a time period for each of a plurality of time intervals for which the information is extracted. The web server in some embodiments further comprises a re-write proxy component configured to direct the transferred first file to an operating system virtualization based container of a file transfer server of the processing platform for delivery to a file repository of the processing platform.

The visualization provided in the file transfer portal illustratively comprises a file transfer dashboard providing a real-time and dynamic indication of file transfer progress updated in each of a plurality of intervals of a configurable interval parameter of the web server.

The processing platform may further comprise a queuing system coupled between the web server and the analytics processor. In such embodiment, the processing platform is further configured to provide the extracted information from the web server to the queuing system for each of a plurality of intervals of a configurable interval parameter of the web server, and to periodically retrieve the extracted information from the queuing system into the analytics processor for use in generating the file transfer statistics.

In some embodiments, dynamic progress insight is provided for bi-directional file transfers. For example, in one such embodiment, the processing platform is further configured, in conjunction with transfer of a second file from the web server of the processing platform to the particular product of the product site, to extract in the web server information characterizing at least a portion of the transfer of the second file to the particular product of the product site. The processing platform is also configured to generate in the analytics processor file transfer statistics for the second file based at least in part on the extracted information, and to provide in the file transfer portal at least one visualization of at least a portion of the file transfer statistics for the second file.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
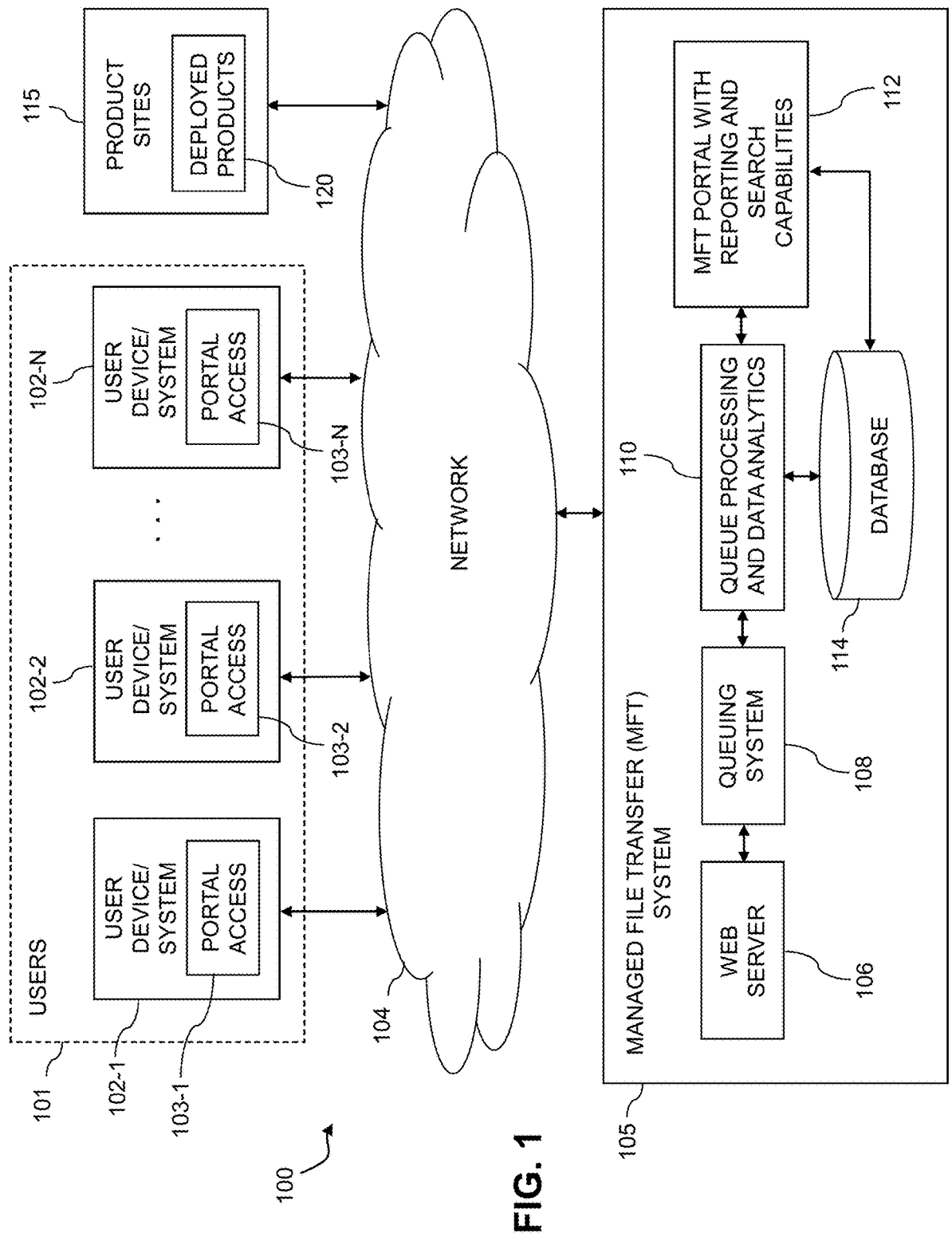
FIG. 1 is a block diagram of an information processing system comprising a processing platform configured for managed file transfer utilizing a configurable web server in an illustrative embodiment.

FIG. 1 shows an information processing system 100 configured in accordance with an illustrative embodiment. The information processing system 100 includes users 101 more particularly comprising respective user devices/systems 102-1, 102-2, . . . 102-N that implement respective portal access modules 103-1, 103-2, . . . 103-N. The user devices/systems 102 are configured to communicate over a network 104 with a managed file transfer (MFT) system 105. The portal access modules 103 may comprise respective web browsers or web browser plug-in components.

As will be described in more detail below, the MFT system 105 is configured to provide managed file transfer functionality for deployed IT products within the information processing system 100. The portal access modules 103 implement user-side aspects such as authentication and verification for control of user access to file transfer visualizations provided via a file transfer portal of the MFT system 105.

The term "device/system" as utilized herein is intended to refer to a device and/or a system, where a system can be comprised of multiple devices. A given user device/system can therefore comprise a user device associated with at least one user and/or a user system associated with at least one user. The variable N is assumed to be an arbitrary positive integer greater than or equal to two.

Examples of user devices include, for example, desktop, laptop or tablet computers, mobile telephones, or other types of processing devices capable of communicating with the MFT system 105 over the network 104.

Examples of user systems include processing platforms implementing software for tracking product information for one or more users.

The term "user" herein is intended to be broadly construed so as to encompass numerous arrangements of human, hardware, software or firmware entities, as well as combinations of such entities.

Managed file transfer functionality can be provided for users under a Function-as-a-Service (FaaS) model, although it is to be appreciated that other types of cloud infrastructure arrangements could be used. For example, at least a portion of the managed file transfer functionality in some embodiments may additionally or alternatively be provided under a Platform-as-a-Service (PaaS) model.

The MFT system 105 in some embodiments may therefore implement at least a portion of a FaaS environment or a PaaS environment accessible to the user devices/systems 102 over the network 104.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The MFT system 105 in some embodiments may be implemented as part of cloud infrastructure in the form of a cloud-based system such as an Amazon Web Services (AWS) system. Other examples of cloud-based systems that can be used to provide at least portions of the MFT system 105 and possibly other portions of system 100 include Google Cloud Platform (GCP) and Microsoft Azure.

The MFT system 105 in the present embodiment comprises a web server 106, a queuing system 108, a queue processing and data analytics module 110, an MFT portal 112 with reporting and search capabilities, and a database 114.

The web server 106 is an example of what is also referred to herein as a "configurable web server," and in some embodiments is implemented as an Apache web server, although other types of web servers can be used in other embodiments.

The queuing system 108 in some embodiments is implemented as a Kafka queuing system, although again other types of queuing systems can be used.

The queue processing and data analytics module 110 is an example of what is more generally referred to herein as an "analytics processor" configured to generate file transfer statistics. In some embodiments, the queue processing and data analytics module 110 is implemented utilizing an Apache Storm module, although other types of analytics processors can be used.

The MFT portal 112 with reporting and search capabilities is an example of what is more generally referred to herein as a "file transfer portal." Other file transfer portals in other embodiments can provide alternative or alternative types of functionality. The MFT portal 112 is accessible to the user devices/systems 102 over the network 104.

The database 114 is utilized by the MFT system 105 to store file transfer statistics generated by the queue processing and data analytics module 110. Those file transfer statistics are accessible to the MFT portal 112 for use in generating one or more visualizations of the file transfer statistics for presentation to one or more of the user devices/systems 102 via their respective portal access modules 103.

More detailed examples of these and other components of an MFT system such as MFT system 105 will be described below in conjunction with FIG. 3.

Also coupled to the network 104 is a plurality of product sites 115 each comprising one or more deployed products 120. For example, in some embodiments the product sites 115 comprise respective data centers and the deployed products 120 comprise storage systems implemented in the respective data centers. Numerous other types of deployed products 120 can be subject to managed file transfer in the system 100, including products providing at least one of compute, storage and network functionality within one or more of the product sites 115. The deployed products 120 can comprise hardware, software or firmware products, as well as combinations of such products.

The MFT system 105 is configured to provide dynamic progress insight for files transferred to or from the deployed products 120 of the product sites 115.

For example, the MFT system 105 is illustratively configured to receive from a given one of the product sites 115 a first file generated by a particular one of the deployed products 120.

The product site may comprise a customer site of a customer of a provider of the particular product. In such an arrangement, the MFT system 105 may be implemented by or on behalf of the provider of the particular product.

The above-noted first file is assumed to be generated by the particular product at the product site. For example, the first file may be received in the MFT system 105 from the particular product via a virtual appliance deployed in conjunction with the particular product at the product site. In some embodiments, the first file comprises usage data for the particular product at the product site.

Additionally or alternatively, the first file may be one of a plurality of Internet-of-Things (IoT) files automatically generated by deployed products 120 at product sites 115.

In conjunction with transfer of the first file from the particular product of the given product site to the web server 106 of the MFT system 105, the web server 106 extracts information characterizing at least a portion of the transfer of the first file from the particular product of the product site.

For example, the web server 106 in some embodiments comprises a configurable plug-in component for extracting the information characterizing at least a portion of the transfer of the first file from the particular product of the product site. The configurable plug-in component provides a configurable interval parameter specifying a time period for each of a plurality of time intervals for which the information is extracted.

The web server 106 can include additional or alternative components. For example, in addition to the above-noted configurable plug-in component, the web server 106 may further comprise a re-write proxy component configured to direct the transferred first file to an operating system virtualization based container (e.g., a Docker container) of a file transfer server of the MFT system 105 for delivery to a file repository. An example of such an arrangement is shown in more detail in the embodiment of FIG. 3 to be described below.

The extracted information characterizing at least a portion of the transfer of the first file from the particular product of the product site illustratively comprises at least a file transfer start time, a number of transferred bytes and a file size, although other types of file transfer information can be extracted by web server 106 in other embodiments.

The queuing system 108 is coupled between the web server 106 and the queue processing and data analytics module 110. The extracted information is provided from the web server 106 to the queuing system 108 for each of a plurality of intervals of a configurable interval parameter of the web server 106. Also, the extracted information is periodically or otherwise retrieved from the queuing system 108 into the queue processing and data analytics module 110 for use in generating file transfer statistics.

The queue processing and data analytics module 110 is therefore configured to generate file transfer statistics for the first file based at least in part on the extracted information retrieved or otherwise obtained from the queuing system 108. The file transfer statistics illustratively comprise at least one of a file transfer rate and a remaining transfer time, although additional or alternative types of file transfer statistics can be generated in other embodiments. The queue processing and data analytics module 110 is further configured to store the file transfer statistics in the database 114.

The file transfer statistics stored in the database 114 can be pulled from the database 114 by the MFT portal 112 via a websockets interface. The MFT portal 112 is configured to provide at least one visualization of at least a portion of the file transfer statistics for the first file.

For example, the visualization provided in the MFT portal 112 illustratively comprises a file transfer dashboard providing a real-time and dynamic indication of file transfer progress updated in each of a plurality of intervals of a configurable interval parameter of the web server 106.

The MFT system 105 can be configured to provide additional managed file transfer functionality. For example, in some embodiments, the MFT system 105 is configured to implement at least one microservice for auditing of the particular product. In such an arrangement, the MFT system 105 is further configured to provide at least portions of the transferred first file from an operating system virtualization based container (e.g., a Docker container) of a file transfer server to the microservice. Auditing results of the microservice are accessible to the MFT portal 112 and may be utilized in generating at least a portion of one or more of the visualizations provided by the MFT portal 112.

Additional files generated by deployed products 120 at product sites 115 are handled in a manner similar to that described above for the first file. References herein to a "first file" should be understood as broadly referring to any of the files that may be generated by one or more deployed products for managed file transfer, and should not be construed as requiring any particular numerical ordering of files.

The MFT system 105 in some embodiments is further configured to provide dynamic progress insight for bi-directional file transfers. For example, in one such embodiment, in conjunction with transfer of a second file from the web server 106 of the MFT system 105 to the particular product of the product site, the web server 106 extracts information characterizing at least a portion of the transfer of the second file to the particular product of the product site. The queue processing and data analytics module 110 obtains the extracted information from the queuing system 108, and generates file transfer statistics for the second file based at least in part on the extracted information. The MFT portal 112 then provides at least one visualization of at least a portion of the file transfer statistics for the second file.

Additional files transferred from MFT system 105 to deployed products 120 at product sites 115 are handled in a manner similar to that described above for the second file. Again, references herein to a "second file" should not be construed as requiring any particular numerical ordering of files.

A given illustrative embodiment of MFT system 105 can therefore be configured to extract information from "live" streaming data in real-time in a web server using a configurable interval threshold for bi-directional file transfers, to apply data analytics to the extracted information in an analytics processor to generate file transfer statistics such as file transfer rate and remaining transfer time, and to display the file transfer statistics to users in an easy-to-read dashboard or other type of visualization of a file transfer portal.

The MFT portal 112 is assumed to be configured with authentication and verification functionality so as to ensure that visualizations and other file transfer information are accessible only to appropriately authenticated and verified ones of the user devices/systems 102. For example, a particular one of the user devices/systems 102 may have access to visualizations and other file transfer information for only certain files associated with certain ones of the deployed products 120 at certain ones of the product sites 115. The MFT portal 112 may therefore require various user-side access control mechanisms for controlling user access. For example, security functionality such as authentication and/or verification of user identity may be required in a given implementation and provided at least in part utilizing portal access modules 103 of the respective user devices/systems 102.

The MFT system 105 may incorporate messaging functionality to notify appropriate ones of the user devices/systems 102 regarding updates to visualizations or other types of file transfer information. It is also possible that the MFT system 105 may permit certain ones of the user devices/systems 102 to download particular ones of the transferred files, for example, by providing those user devices/systems with uniform resource locators (URLs) or other types of links to those files in one or more notification messages of a messaging framework implemented within MFT system 105.

It is assumed that the MFT system 105 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The MFT system 105 is assumed to comprise one or more storage systems configured to implement database 114 and associated backend storage or other file repositories as well as other types of storage devices.

Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system of MFT system 105 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

The MFT system 105 is an example of what is more generally referred to herein as a "processing platform." The term "processing platform" as used herein is intended to be broadly construed so as to encompass, by way of illustration and without limitation, multiple sets of processing devices and one or more associated storage systems that are configured to communicate over one or more networks.

As a more particular example, the web server 106, queuing system 108, queue processing and data analytics module 110 and MFT portal 112 can each be implemented at least in part in the form of one or more LXCs running on one or more VMs. Other arrangements of one or more processing devices of a processing platform can be used to implement these and other components of the MFT system 105. Other portions of the system 100 can similarly be implemented using one or more processing devices of at least one processing platform.

Distributed implementations of the system 100 are possible, in which certain components of the system reside in one data center in a first geographic location while other components of the system 100 reside in one or more other data centers in one or more other geographic locations that are potentially remote from the first geographic location. Thus, it is possible in some implementations of the system 100 for different portions of the MFT system 105 to reside in different data centers. Numerous other distributed implementations of the MFT system 105 are possible.

Although illustratively shown as being implemented within the MFT system 105, components such MFT portal 112 and database 114 can be implemented at least in part externally to the MFT system 105. For example, such components can each be implemented at least in part within another system element or at least in part utilizing one or more stand-alone components coupled to the network 104.

It is to be appreciated that these and other features of illustrative embodiments are presented by way of example only, and should not be construed as limiting in any way.

Accordingly, different numbers, types and arrangements of system components such as web server 106, queuing system 108, queue processing and data analytics module 110, MFT portal 112 and database 114 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments functionality for managed file transfer can be offered to cloud infrastructure customers or other users as part of a FaaS or PaaS offering.

The operation of the information processing system 100 will now be described in further detail with reference to the flow diagram of FIG. 2. The process as shown includes steps 200 through 208, and is suitable for use in the system 100 but is more generally applicable to other types of information processing systems comprising at least one processing platform configured to provide managed file transfer functionality. The process is more particularly assumed to be implemented in at least one processing platform configured to communicate over one or more networks with at least one product site and a plurality of user devices/systems.

In step 200, in conjunction with transfer of a given file from a particular product of a product site to a web server of the processing platform, the web server extracts information characterizing at least a portion of the transfer of the file from the particular product of the product site. The file may comprise one of a plurality of IoT files automatically generated by deployed products at multiple product sites.

In step 202, an analytics processor of the processing platform generates file transfer statistics for the file based at least in part on the extracted information.

The particular type of file transfer statistics generated can be unique for every file transfer within a given file transfer session, based at least in part on configurable parameters of the web browser. For example, the file transfer statistics are generated in some embodiments from information extracted from a "live" byte stream of an in-progress file transfer, thereby supporting real-time analytics. The file can be of any type or format and need not be subject to any size restrictions. Historical file transfer statistics may be stored in a database for use in future data analytics.

In some embodiments, a queuing system is coupled between the web server and the analytics processor. The extracted information is provided from the web server to the queuing system for each of a plurality of intervals of a configurable interval parameter of the web server. Also, the extracted information is periodically retrieved from the queuing system into the analytics processor for use in generating the file transfer statistics.

In step 204, a file transfer portal of the processing platform provides at least one visualization of at least a portion of the file transfer statistics for the file. The file transfer portal is accessible to one or more of the user devices/systems over the one or more networks. Such an arrangement provides at least one user with dynamic progress insight into the transfer of the file. For example, the file transfer portal can be configured to provide the user with an ability to view active file transfer status visually via a real-time progress bar with indication of estimated time remaining in the file transfer.

In step 206, a determination is made regarding whether or not the transfer of the file from the particular product at the product site is complete.

If the file transfer is complete, the file is written to a file repository as indicated in step 208. The file repository may comprise backend storage or another type of long-term storage, such as a cloud-based object store.

If the file transfer is not complete, the process returns to step 200 for further information extraction, file transfer statistics generation and file transfer portal visualization generation in one or more additional iterations of steps 200, 202 and 204 for respective ones of one or more additional portions of the file.

Figure 2:
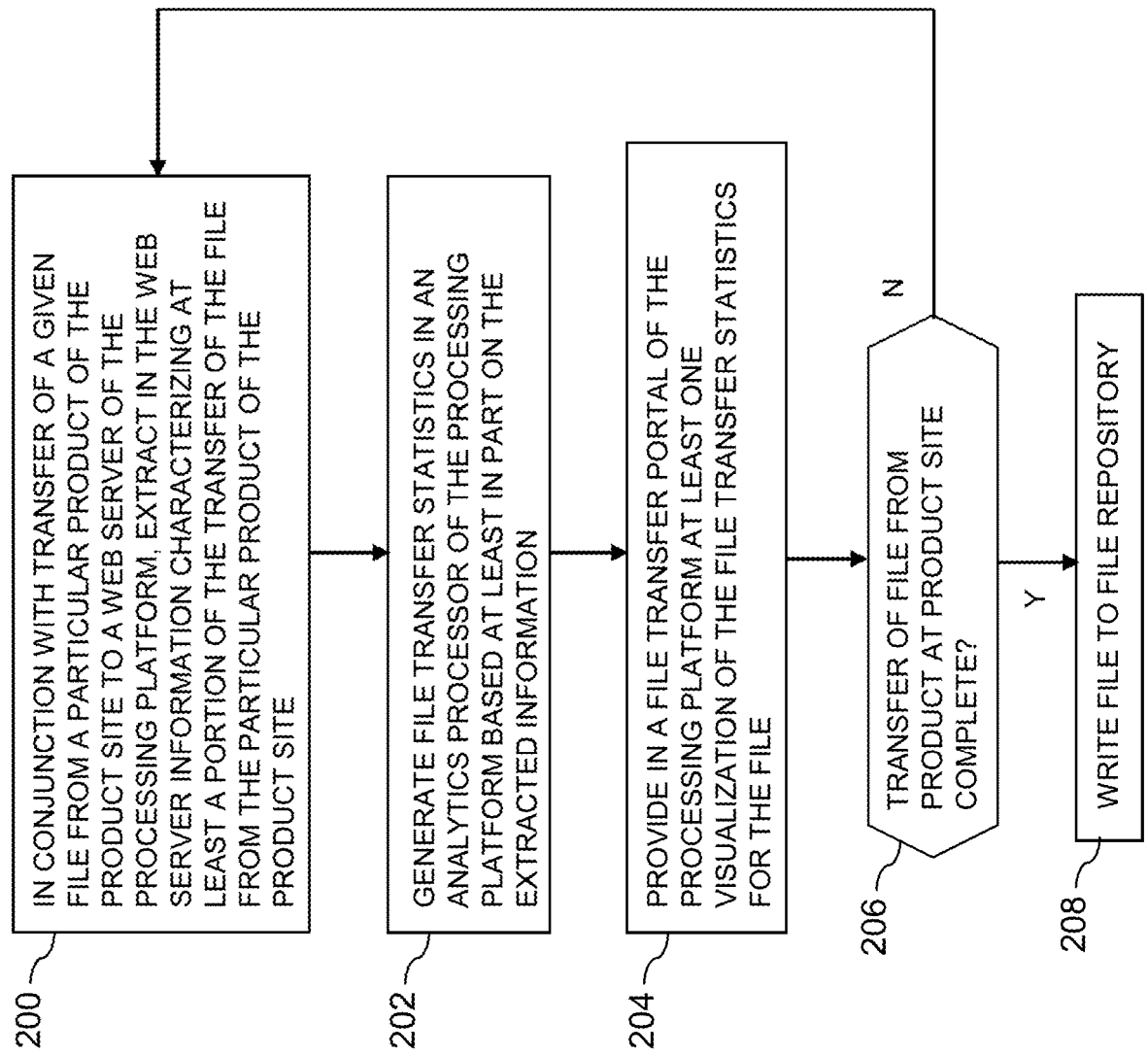
FIG. 2 is a flow diagram of a process for managed file transfer utilizing a configurable web server in an illustrative embodiment.

The FIG. 2 process as described above can be modified in a straightforward manner to support dynamic progress insight for bi-directional file transfer. For example, in conjunction with transfer of a second file from the web server to the particular product of the product site, the web server extracts information characterizing at least a portion of the transfer of the second file to the particular product of the product site. The analytics processor generates file transfer statistics for the second file based at least in part on the extracted information, and the file transfer portal provides at least one visualization of at least a portion of the file transfer statistics for the second file. Accordingly, some embodiments can be configured to provide users with visualizations of real-time bi-directional file transfer statistics.

It is to be appreciated that the FIG. 2 process and other managed file transfer functionality described above can be adapted for use with other types of information systems comprising one or more processing platforms.

The particular processing operations and other system functionality described in conjunction with the flow diagram of FIG. 2 are therefore presented by way of illustrative example only, and should not be construed as limiting the scope of the disclosure in any way. Alternative embodiments can use other types of processing operations involving managed file transfer. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another, in order to implement a plurality of different managed file transfer instances for different files within a processing platform of a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

An additional illustrative embodiment incorporating functionality for managed file transfer will now be described with reference to FIG. 3.

Figure 3:
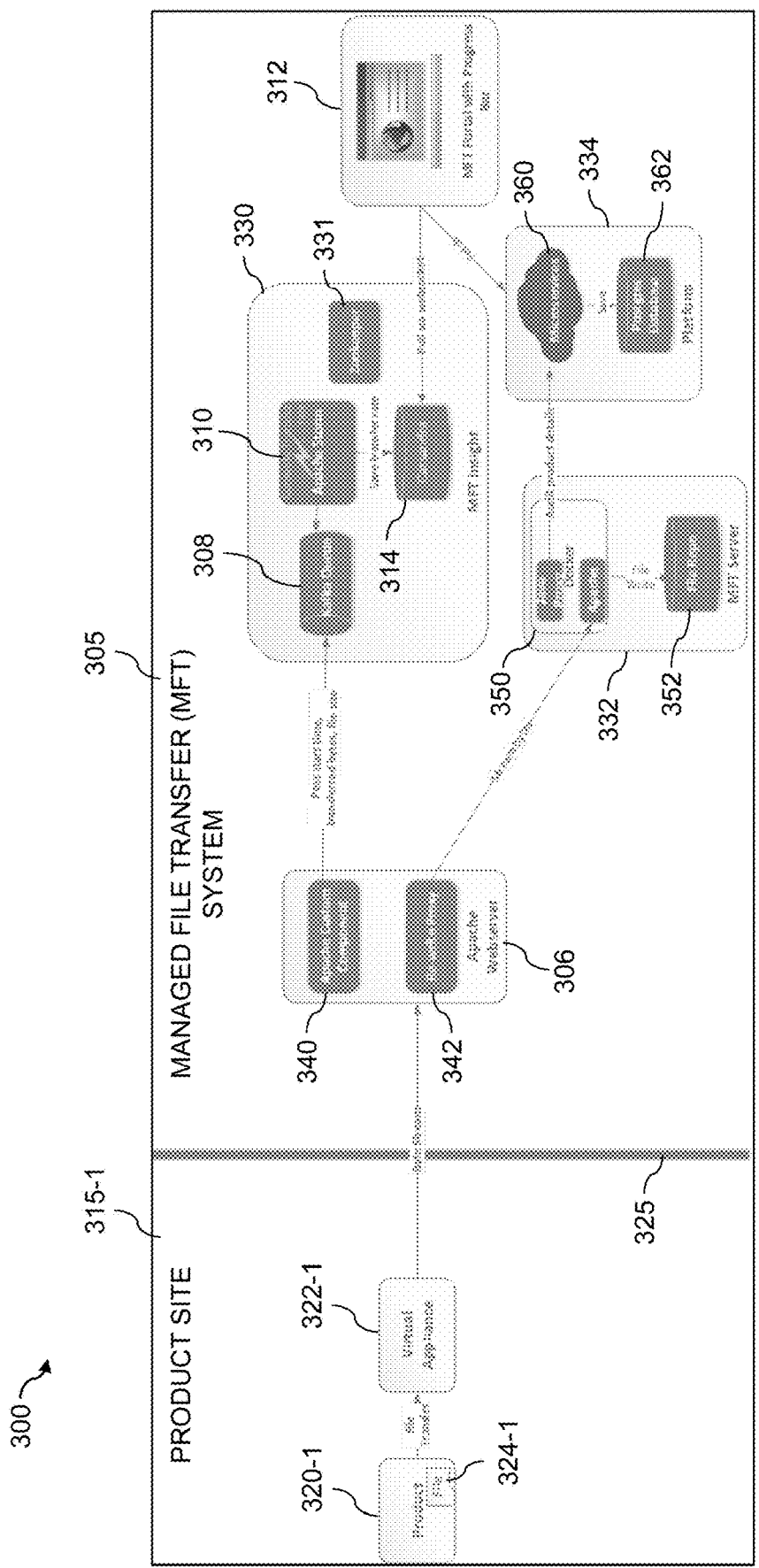
FIG. 3 is a block diagram of another information processing system implementing functionality for managed file transfer utilizing a configurable web server in an illustrative embodiment.

FIG. 3 shows another information processing system 300 comprising an MFT system 305 providing managed file transfer functionality for files transferred from and to deployed products at one or more product sites. The information processing system 300 is assumed to further comprise user devices/systems that are coupled to the MFT system 305 via one or more networks, although such components are not explicitly shown in the figure. The user devices/systems illustratively correspond to respective consumers associated with particular deployed products and product sites.

The MFT system 305 comprises a web server 306, a queuing system 308, a queue processing and data analytics module 310, an MFT portal 312 and a database 314, all of which operate in a manner similar to that previously described for the respective corresponding components 106, 108, 110, 112 and 114 of the FIG. 1 embodiment.

The system 300 further comprises a product site 315-1 at which there is deployed a particular product 320-1. The product site 315-1 illustratively comprises a customer site of a customer of a provider of the particular product 320-1. The MFT system 305 may be implemented by or on behalf of the provider of the particular product 320-1. For example, the product 320-1 may comprise a Dell EMC storage array or other Dell EMC storage product of the type described elsewhere herein. Such a product is illustratively deployed at a customer site, with files generated by or otherwise originating from that product being transferred to a file repository using managed file transfer functionality of the MFT system 305.

A given file 324-1 generated by the product 320-1 deployed at the product site 315-1 is received in the MFT system 305 via a virtual appliance 322-1 deployed in conjunction with the particular product 320-1 at the product site 315-1. The virtual appliance 322-1 is separated from the MFT system 305 by a firewall 325. The firewall 325 is part of at least one network interconnecting product site 315-1 with the MFT system 305. The file 324-1 may comprise usage data for the particular product 320-1 at the product site 315-1, although numerous other types of data suitable for managed file transfer can be included in the file 324-1. The file 324-1 can be of any format with no specific size limitations.

In the FIG. 3 embodiment, the queuing system 308, queue processing and data analytics module 310 and database 314 are illustratively shown as being part of an MFT insight module 330 of the MFT system 305. The queuing system 308 is more particularly implemented as a Kafka queue, the queue processing and data analytics module 310 is more particularly implemented as an Apache Storm module, and the database 314 is more particularly implemented as a Cassandra database. The MFT insight module 330 illustratively comprises one or more additional modules, such as an Apache Zookeeper module 331. The Zookeeper module 331 provides a centralized service for maintaining configuration information for use by distributed applications accessing the MFT system 305.

Other components of the MFT system 305 include an MFT server 332 and a microservices platform 334. The MFT server 332 is an example of what is more generally referred to herein as a "file transfer server" of the MFT system 305. Such a file transfer server illustratively comprises one or more operating system virtualization based containers (e.g., Docker containers) of a processing platform of the MFT system 305. The MFT server 332 and the microservices platform 334, and possibly one or more other components of the MFT system 305, may be implemented on a common processing platform.

The web server 306 in the present embodiment more particularly comprises an Apache web server having an Apache custom component 340 and a re-write proxy 342. The Apache custom component 340 is an example of what is more generally referred to herein as a "configurable plug-in component" for extracting the information characterizing at least a portion of the transfer of a given file from a particular product of a product site. Such a component illustratively provides a configurable interval parameter specifying a time period for each of a plurality of time intervals for which the information is extracted over the course of the file transfer. Additional or alternative configurable parameters may also be provided within a configurable plug-in component of web server 306.

In the present embodiment, the Apache custom component 340 is configured to post information such as start time, transferred bytes and file size for the transfer of file 324-1 to the queuing system 308. It is assumed that the file 324-1 is transferred from the virtual appliance 322-1 to the web server 306 as a byte stream.

The extracted information characterizing at least a portion of the transfer of the file 324-1 from the product 320-1 of the product site 315-1 therefore illustratively comprises a file transfer start time, a number of transferred bytes and a file size.

The re-write proxy 342 of the web server 306 is configured to direct stream bytes of the file 324-1 to an operating system virtualization based container 350 of the MFT server 332 for delivery to a file repository 352.

The queuing system 308 is coupled between the web server 306 and the queue processing and data analytics module 310. The information extracted from the file transfer byte stream by the web server 306 is provided to the queuing system 308 for each of a plurality of intervals of a configurable interval parameter of the web server 306. The queue processing and data analytics module 310 periodically retrieves the extracted information from the queuing system 308 for use in generating file transfer statistics. The file transfer statistics in this embodiment illustratively comprise at least a file transfer rate, and may include additional or alternative file transfer statistics such as a remaining transfer time.

The queue processing and data analytics module 310 is configured to store the file transfer statistics in the database 314, which as noted above illustratively comprises a Cassandra database. The file transfer statistics stored in the database 314 are pulled from the database 314 by the MFT portal 312 via a web sockets interface. The MFT portal 312 utilizes the file transfer statistics to generate one or more visualizations relating to the on-going transfer of file 324-1 from product site 315-1 to the MFT system 305. For example, a given such visualization provided in the MFT portal 312 comprises a file transfer dashboard providing a real-time and dynamic indication of file transfer progress updated in each of a plurality of intervals of a configurable interval parameter of the web server 306. The real-time and dynamic indication of file transfer progress comprises, for example, a progress bar.

The MFT system 305 further implements in microservices platform 334 a plurality of microservices 360, including at least one microservice for auditing of the particular product 320-1 that generates the file 324-1. At least portions of the transferred file 324-1 are provided from the operating system virtualization based container 350 of the MFT server 332 to the auditing microservice of the microservices 360. Auditing results of the auditing microservice are accessible to the MFT portal 312 and utilized in generating the visualizations. For example, the MFT portal illustratively fetches those results from the microservices platform 334. The microservices platform 334 further comprises an additional database 362, implemented by way of example as a Postgres database, configured to store the auditing results and other outputs of the microservices 360 of the microservices platform 334.

Like other embodiments described previously, the particular components, features and functionality of the FIG. 3 embodiment are presented by way of illustrative example only, and should not be construed as limiting in any way.

Illustrative embodiments of systems with controlled file distribution using managed file transfer functionality as disclosed herein can provide a number of significant advantages relative to conventional arrangements.

For example, some embodiments are configured to implement managed transfer of a given file from a particular product at a product site to a file repository in a manner that provides system users with real-time and dynamic progress insight regarding the file transfer.

Such embodiments can advantageously provide significantly improved visibility into automated file transfer from a wide variety of different IT products deployed at customer sites or other types of product sites within an information processing system, while also avoiding the need for the any type of manual intervention.

Moreover, some embodiments provide dynamic progress insight for bi-directional file transfers with the dynamic progress insight being provided in a visualization of a file transfer portal, illustratively supported by a websockets interface to a real-time file transfer statistics database.

Illustrative embodiments are well-suited for use with transfer of IoT files and other types of files from and to deployed products at multiple product sites, and are applicable to a wide variety of distinct file types.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the MFT system 105 or portions thereof are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
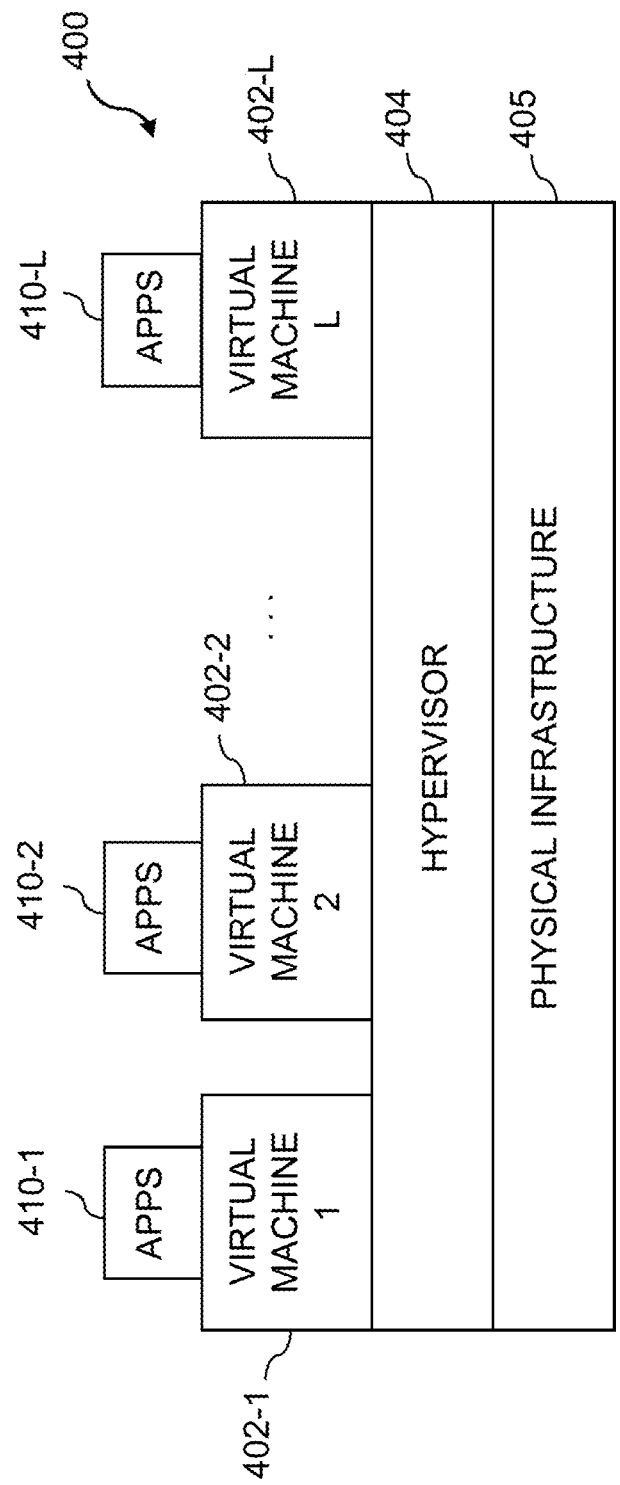
FIGS. 4 and 5 show examples of processing platforms that may be utilized to implement at least a portion of an information processing system in illustrative embodiments.
Figure 5:
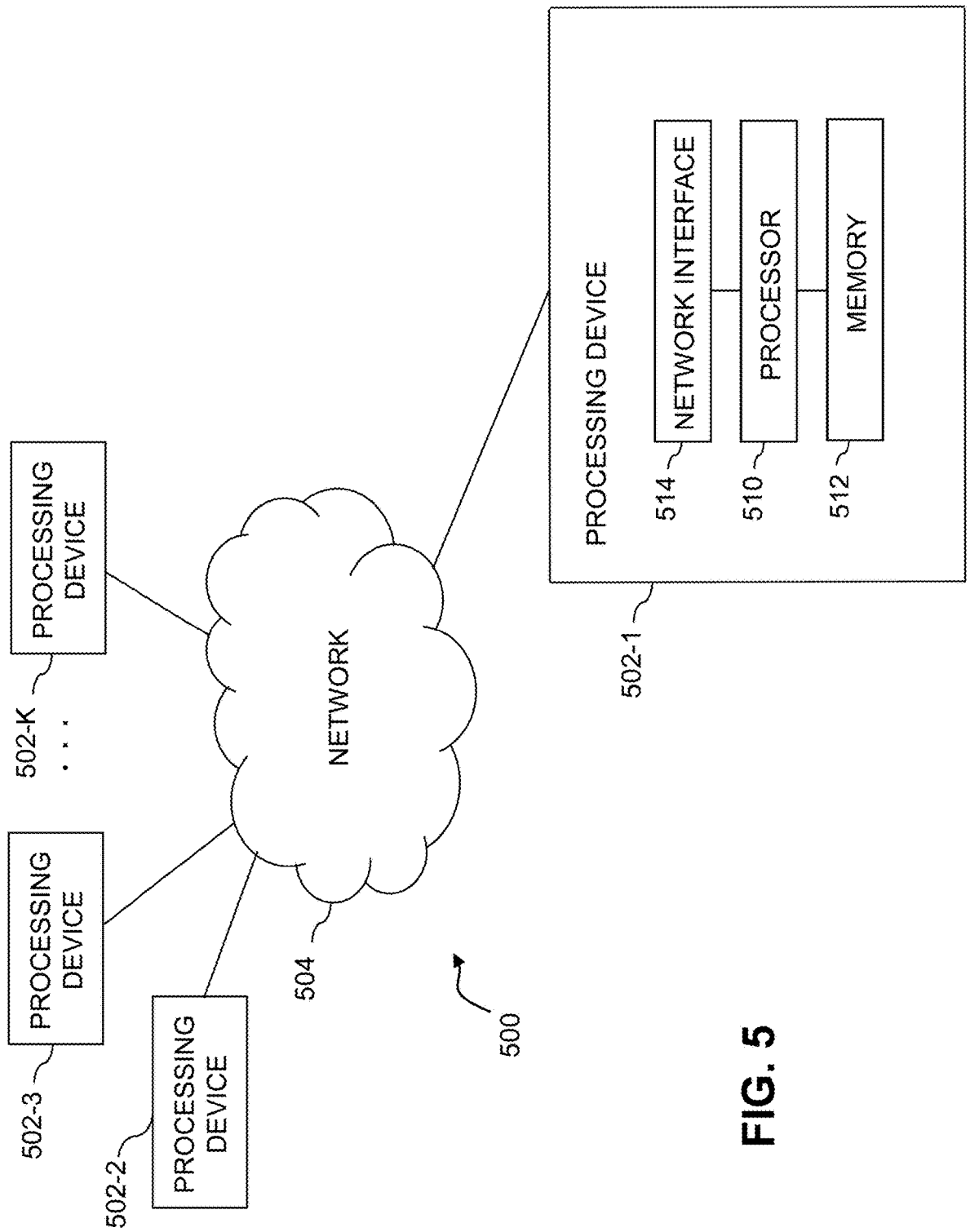

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the MFT system 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, user devices/systems, MFT systems, web servers, queuing systems, analytics processors, file transfer portals, product sites and deployed products. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
the processing platform being configured to communicate over one or more networks with at least one product site and a plurality of user devices/systems;
the processing platform comprising:
a web server;
an analytics processor; and
a file transfer portal accessible to one or more of the user devices/systems over the one or more networks;
wherein the processing platform is further configured:
in conjunction with transfer of a first file from a particular product of the product site to the web server of the processing platform, to extract in the web server information characterizing at least a portion of the transfer of the first file from the particular product of the product site;
to generate in the analytics processor file transfer statistics for the first file based at least in part on the extracted information; and
to provide in the file transfer portal at least one visualization of at least a portion of the file transfer statistics for the first file;
to implement at least one microservice for auditing of the particular product; and
to provide at least portions of the transferred first file from an operating system virtualization based container of a file transfer server of the processing platform to the microservice;
wherein auditing results of the microservice are accessible to the file transfer portal and utilized in generating the visualization.

2. The apparatus of claim 1 wherein the product site comprises a customer site of a customer of a provider of the particular product and the processing platform is implemented by or on behalf of the provider of the particular product.

3. The apparatus of claim 1 wherein the first file is generated by the particular product at the product site.

4. The apparatus of claim 1 wherein the first file is received in the web server of the processing platform from the particular product via a virtual appliance deployed in conjunction with the particular product at the product site.

5. The apparatus of claim 1 wherein the first file comprises usage data for the particular product at the product site.

6. The apparatus of claim 1 wherein the web server comprises a configurable plug-in component for extracting the information characterizing at least a portion of the transfer of the first file from the particular product of the product site.

7. The apparatus of claim 6 wherein the configurable plug-in component provides a configurable interval parameter specifying a time period for each of a plurality of time intervals for which the information is extracted.

8. The apparatus of claim 1 wherein the web server comprises a re-write proxy component configured to direct the transferred first file to an operating system virtualization based container of a file transfer server of the processing platform for delivery to a file repository of the processing platform.

9. The apparatus of claim 1 wherein the extracted information characterizing at least a portion of the transfer of the first file from the particular product of the product site comprises at least a file transfer start time, a number of transferred bytes and a file size.

10. The apparatus of claim 9 wherein the file transfer statistics comprise at least one of a file transfer rate and a remaining transfer time.

11. The apparatus of claim 1 wherein the analytics processor is configured to store the file transfer statistics in a database and wherein the file transfer statistics stored in the database are pulled from the database by the file transfer portal via a websockets interface.

12. The apparatus of claim 1 wherein the visualization provided in the file transfer portal comprises a file transfer dashboard providing a real-time and dynamic indication of file transfer progress updated in each of a plurality of intervals of a configurable interval parameter of the web server.

13. The apparatus of claim 1 wherein the processing platform further comprises a queuing system coupled between the web server and the analytics processor and wherein the processing platform is further configured:
to provide the extracted information from the web server to the queuing system for each of a plurality of intervals of a configurable interval parameter of the web server; and
to periodically retrieve the extracted information from the queuing system into the analytics processor for use in generating the file transfer statistics.

14. The apparatus of claim 1 wherein the processing platform is further configured:
in conjunction with transfer of a second file from the web server of the processing platform to the particular product of the product site, to extract in the web server information characterizing at least a portion of the transfer of the second file to the particular product of the product site;
to generate in the analytics processor file transfer statistics for the second file based at least in part on the extracted information; and
to provide in the file transfer portal at least one visualization of at least a portion of the file transfer statistics for the second file.

15. A method comprising:
configuring at least one processing platform to communicate over one or more networks with at least one product site and a plurality of user devices/systems;
in conjunction with transfer of a first file from a particular product of the product site to a web server of the processing platform, extracting in the web server information characterizing at least a portion of the transfer of the first file from the particular product of the product site;
generating in an analytics processor of the processing platform file transfer statistics for the first file based at least in part on the extracted information; and
providing in a file transfer portal of the processing platform at least one visualization of at least a portion of the file transfer statistics for the first file;
the file transfer portal being accessible to one or more of the user devices/systems over the one or more networks;
the method further comprising:
implementing at least one microservice for auditing of the particular product; and
providing at least portions of the transferred first file from an operating system virtualization based container of a file transfer server of the processing platform to the microservice;
wherein auditing results of the microservice are accessible to the file transfer portal and utilized in generating the visualization; and
wherein the method is performed by a plurality of processing devices of the processing platform.

16. The method of claim 15 wherein the processing platform further comprises a queuing system coupled between the web server and the analytics processor and wherein the method further comprises:
providing the extracted information from the web server to the queuing system for each of a plurality of intervals of a configurable interval parameter of the web server; and
periodically retrieving the extracted information from the queuing system into the analytics processor for use in generating the file transfer statistics.

17. The method of claim 15 further comprising:
in conjunction with transfer of a second file from the web server of the processing platform to the particular product of the product site, extracting in the web server information characterizing at least a portion of the transfer of the second file to the particular product of the product site;
generating in the analytics processor file transfer statistics for the second file based at least in part on the extracted information; and
providing in the file transfer portal at least one visualization of at least a portion of the file transfer statistics for the second file.

18. A computer program product comprising a non-transitory processor-readable storage medium having stored therein program code of one or more software programs, wherein the program code when executed by at least one processing platform comprising a plurality of processing devices, the processing platform being configured to communicate over one or more networks with at least one product site and a plurality of user devices/systems, causes the processing platform:
in conjunction with transfer of a first file from a particular product of the product site to a web server of the processing platform, to extract in the web server information characterizing at least a portion of the transfer of the first file from the particular product of the product site;
to generate in an analytics processor of the processing platform file transfer statistics for the first file based at least in part on the extracted information; and
to provide in a file transfer portal of the processing platform at least one visualization of at least a portion of the file transfer statistics for the first file;
the file transfer portal being accessible to one or more of the user devices/systems over the one or more networks;
wherein the processing platform is further configured:
to implement at least one microservice for auditing of the particular product; and
to provide at least portions of the transferred first file from an operating system virtualization based container of a file transfer server of the processing platform to the microservice;
wherein auditing results of the microservice are accessible to the file transfer portal and utilized in generating the visualization.

19. The computer program product of claim 18 wherein the processing platform further comprises a queuing system coupled between the web server and the analytics processor and wherein the processing platform is further configured:

to provide the extracted information from the web server to the queuing system for each of a plurality of intervals of a configurable interval parameter of the web server; and to periodically retrieve the extracted information from the queuing system into the analytics processor for use in generating the file transfer statistics.

20. The computer program product of claim 18 wherein the processing platform is further configured:

in conjunction with transfer of a second file from the web server of the processing platform to the particular product of the product site, to extract in the web server information characterizing at least a portion of the transfer of the second file to the particular product of the product site;

to generate in the analytics processor file transfer statistics for the second file based at least in part on the extracted information; and to provide in the file transfer portal at least one visualization of at least a portion of the file transfer statistics for the second file.

\* \* \* \* \*